S. MARQUIS.
FARM GATE.
APPLICATION FILED SEPT. 4, 1918.

1,290,769.

Patented Jan. 7, 1919.
2 SHEETS—SHEET 1.

Witness
R. A. Thomas

Inventor
Samuel Marquis
By Victor J. Evans
Attorney

S. MARQUIS.
FARM GATE.
APPLICATION FILED SEPT. 4, 1918.

1,290,769.

Patented Jan. 7, 1919.
2 SHEETS—SHEET 2.

Witnesses
R. A. Thomas

Inventor
Samuel Marquis.
By Victor J. Evans
Attorney

UNITED STATES PATENT OFFICE.

SAMUEL MARQUIS, OF MIDDLEBURG, OHIO.

FARM-GATE.

1,290,769.     Specification of Letters Patent.     Patented Jan. 7, 1919.

Application filed September 4, 1918. Serial No. 252,571.

*To all whom it may concern:*

Be it known that I, SAMUEL MARQUIS, a citizen of the United States, residing at Middleburg, in the county of Logan and State of Ohio, have invented new and useful Improvements in Farm-Gates, of which the following is a specification.

This invention has reference to an improved construction of gates.

The improvement is primarily directed to farm gates, and has for its primary object to produce a device of this character which, while of a comparatively simple construction is of great strength and rigidity.

A further object of the invention is to construct a farm gate of parallel slats suitably spaced by blocks therebetween, reinforcing members being arranged upon the sides of the gate and covering the sides of the blocks and being secured to certain of the slats.

It is a further object of the invention to produce a farm gate which is so braced from its hinges to hold the same against sagging and which is provided with means for adjusting the same, so that the said gate may be swung over uneven surfaces.

Other objects and advantages will appear as the nature of the invention is better understood, reference being had to the accompanying drawings, in which.

Figure 1:
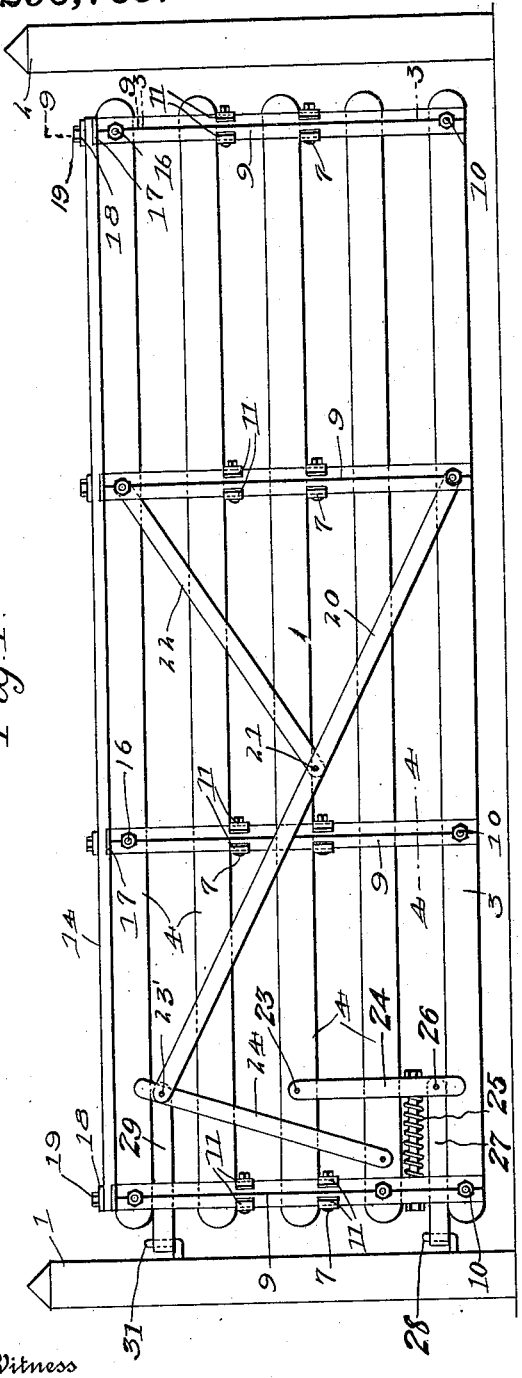
Figure 1 is an elevation illustrating the gate constructed in accordance with this invention in its closed position.
Figure 2:
Fig. 2 is a top plan view of the same.
Figure 9:
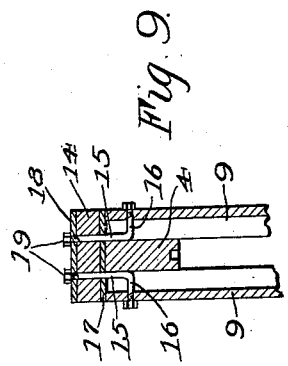
Fig. 9 is a detail enlarged sectional view approximately on the line 9—9 of Fig. 1.
Figure 4:
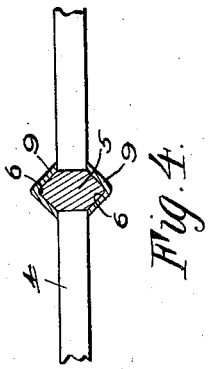
Fig. 4 is a sectional view approximately on the line 4—4 of Fig. 1.
Figure 5:
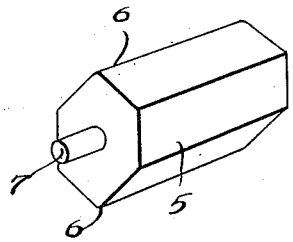
Fig. 5 is a perspective view of one of the spacing blocks.
Figure 6:
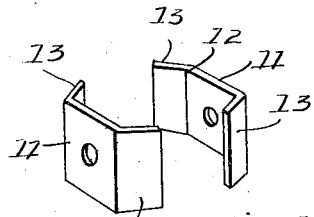
Fig. 6 is a perspective view of one of the clips.
Figure 7:
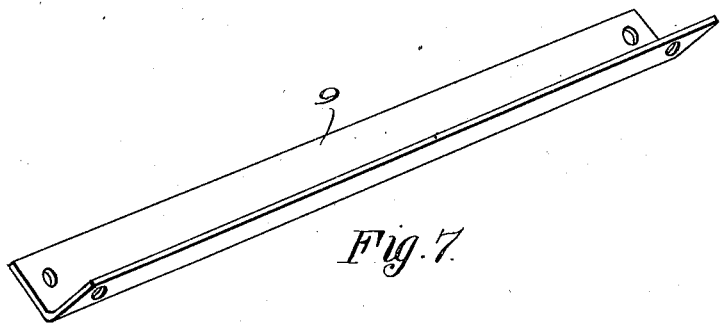
Fig. 7 is a perspective view of one of the angle plates.
Figure 3:
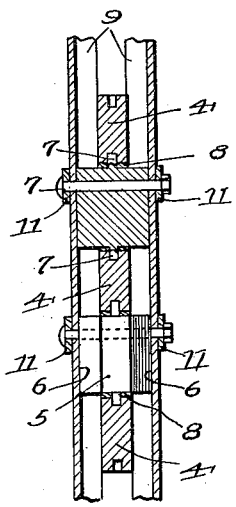
Fig. 3 is a sectional view approximately on the line 3—3 of Fig. 1.
Figure 8:
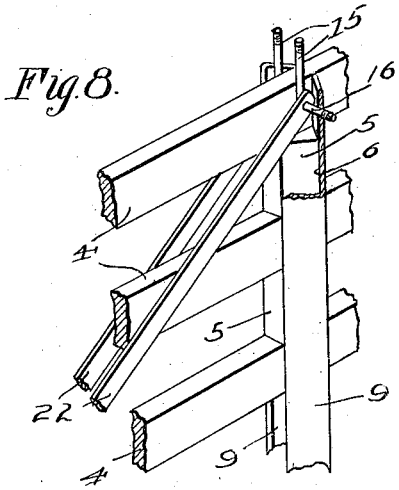
Fig. 8 is a detail perspective view of a portion of the upper edge of the gate, the cap plate being removed, parts being broken away and parts being in section.

Referring now to the drawings in detail, the numeral 1 designates a hinge post, and 2 an abutment post. Between these posts the gate 3 is arranged for swinging movement, and while not illustrated in the drawings, suitable latching means is provided between the gate and the abutment post 2.

As disclosed by the drawings the gate 3 is made up of longitudinally arranged slats 4. Between these slats are arranged vertically disposed blocks 5, the outer edge of the same being substantially V-shaped as indicated by the numeral 6. The blocks 5 are arranged in alining series, and any desired number of such series may be employed. In practice I have found that three of the vertical members of the gate, provided by the series of blocks is sufficient for an ordinary farm gate, and such number has been illustrated by the drawings.

The blocks 5 may and preferably have their opposite ends provided with pintles 7 which may enter the confronting edges of the slats between which the said blocks are arranged, and also if desired certain of the pintles may be provided with washers 8 that contact with the ends of the blocks. The V-shaped edges of the blocks extend beyond the sides of the slats, the straight sides of the blocks being of a width equaling the thickness of the slats. These V-shaped projecting portions of the blocks are covered by angle irons 9, the said angle irons preferably having their lower portions secured to the lower slat by bolts or analogous devices, indicated by the numerals 10. The angle irons are engaged by the notched edges of plates 11, one series of such plates being arranged at the bottom of the second slat from the top, and the other plate on the bottom of the third slat from the bottom of the gate. The plates 11 are in the nature of clips, and the notches 12 thereof have their end walls beveled inwardly as at 13, whereby to engage with the opposite angle outer surfaces of the vertically disposed irons 9.

On the top slat 4 is arranged a cap bar or plate 14. The cap plate is preferably constructed of wood and is of a width to cover the upper ends of the angle irons 9. The cap 14 is sustained upon the gate through the medium of angle bolts or members. These members have the shank portions opposite the headed ends thereof passing through the openings in the angle irons 9, the straight portions being indicated by the numeral 15. The angle portions of the securing members are indicated by the numeral 16 and are disposed to contact with the opposite sides of the upper slat 4 and to pass through metal plates 17 arranged below the cap plate 14 on the outer edge of the upper slat 4. The vertical or angle portions of the securing elements are threaded and pass through suitable openings in the cap plate and, if desired, through suitable openings in metal plates 18. The threaded ends of the angle bolts are engaged by nuts 19, and the adjustment of these nuts, it will be noted, permits of the vertical adjustment of the gate and any portion thereof in a line with the vertical elements therefor, that is to say, any of the series of the blocks 5. It is, of course, to be understood that the notched plates or clips 11 receive the pintles 7, and if desired the said pintles 7 may form a part of the said clip or the said clips may be revolubly associated with the pintles.

A gate, constructed as above described may, it will be noted, be cheaply and easily manufactured, the metal parts protecting the wooden filler blocks, and as the parts are designed to be manufactured in stock sizes the same may be assembled in an expeditious manner.

Except for the angle irons and the bolts and nuts therefor, all the parts of the gate heretofore described are constructed of wood, and the gate is effectively braced and held against sagging by an arrangement of parts connected with and operated by the hinge connection between the gate and the hinge post 1.

On the opposite sides of the gate, and pivotally connected by the bolts which secure the outer angle iron 9 to the lower slat 10, are metal straps or bars 20. These bars are arranged at an upward inclination and terminate a suitable distance inward of the gate with respect to the hinged end of the gate. Pivotally secured to the straps 20, as at 21 are shorter metal straps 22, the latter being arranged at an outward inclination and having their ends engaged by the angle portions attached to the angle iron 9 to which the strap 20 is pivotally connected. It will be noted that the pivot 21 between the straps 20 and 22 underlies and may rest against the lower edge of one of the slats 4.

Pivotally secured, as at 23 to the central slat 4 are metal bars 24, arranged on the opposite sides of the gate. The lower ends of these bars straddle the lower slat 4 of the gate 3. The bars 24 are influenced in one direction by a spring 25 that exerts a tension between one of the vertical end posts of the gate and the said bars. The spring 25 encircles an adjustable member in the nature of a bolt which is connected between the bars and between the said vertical end member of the gate. Between the bars 24, and preferably resting upon the upper edge of the lower slat 4 of the gate 3 is pivotally secured, as at 26, a plate 27 that has its outer end provided with an eye receiving therethrough a pintle member 28 having an angle end which is secured to the post 1.

The pivot 23' between the straps 20 and the straps 24 serves as a means for connecting therebetween a bar 29 that has its outer end provided with an eye 30, and this eye receives therethrough a pintle 31 secured on the angle end of an element that is connected to the post 1. By this means the gate is hingedly connected to the post.

The hinged connection for the gate is such that the outer end of the gate is held against downward sagging, the straps serving as bracing elements for the gate, and it is believed from the foregoing description that the construction and operation of parts will be apparent without further detailed description.

Having thus described the invention, what is claimed as new, is:—

1. A farm gate made up of spaced parallel slats, spacing blocks therebetween, and vertical plates arranged over the sides of the spacing blocks and connected with certain of the slats.

2. A farm gate made up of spaced parallel slats, spacing blocks between the slats and having their ends projecting beyond the ends of the slats, channeled irons receiving the projecting ends of the said blocks and secured to certain of the slats.

3. A farm gate made up of spaced parallel slats, spacing blocks therebetween, vertically disposed plates arranged over the sides of the spacing blocks, means for rigidly connecting the plates to the lower slat, and means for adjustably connecting the plates to the upper slat.

4. A farm gate made up of parallel slats, spacing blocks therebetween, plates arranged over the sides of the spacing blocks, clips on certain of the spacing blocks engaging said plates, means for rigidly connecting the plates to the lower slat, and means for adjustably connecting said plates to the upper slat of the gate.

5. A farm gate made up of spaced parallel slats, spacing blocks having V-shaped ends between the slats and the said ends projecting beyond the sides of the slats, angle irons on the sides of the gates and receiving the projecting ends of the spacing blocks, notched clips on certain of the blocks engaging with the angle irons, bolts securing the angle irons to the lower slats; a cap plate on the upper slat, and adjustable means between the angle irons contacting with the sides of the upper slat and adjustably securing the cap plate to the said upper slat.

6. A farm gate made up of spaced parallel slats, spacing blocks therebetween, pintles on said blocks entering said slats, clips having notched edges on certain of the pintles, said blocks having their edges projecting beyond the sides of the slats, channeled irons receiving said edges and engaged by the notched edges of the clips, means for pivotally securing the channeled irons to the lower slat, a cap plate on the upper slat, and adjustable means between said cap plate and said channeled irons for securing the cap plate on the gate.

7. A farm gate made up of spaced parallel slats, spacing blocks therebetween, vertical plates arranged over the sides of the spacing blocks and connected with certain of the slats, straps pivoted between one of the vertical plates and the lower slat and extending at an upward angle rearwardly of the gate, straps pivotally connected to the vertical plates and to the first mentioned straps and the pivot between said straps contacting with the lower edge of one of the slats, bars pivotally secured to the ends of the first mentioned straps and extending at a downward angle at the rear of the gate, plates pivotally connected between said bars adjacent the upper and lower ends thereof, and said plates having their ends extended beyond one of the ends of the gate and provided with eyes, as and for the purpose set forth.

In testimony whereof I affix my signature.

SAMUEL MARQUIS.

Copies of this patent may be obtained for five cents each, by addressing the "Commissioner of Patents, Washington, D. C."